United States Patent [19]

Karol et al.

[11] 4,390,677

[45] Jun. 28, 1983

[54] ARTICLE MOLDED FROM ETHYLENE HYDROCARBON COPOLYMER

[76] Inventors: Frederick J. Karol; George L. Goeke, both of Belle Mead; Burkhard E. Wagner, Highland Park; William A. Fraser, Princeton, all of N.J.; Robert J. Jorgensen, Dunbar, W. Va.; Nils Friis, Macungie, Pa.

[21] Appl. No.: 14,413

[22] Filed: Feb. 27, 1979

Related U.S. Application Data

[63] Continuation-in-part of Ser. No. 892,323, Mar. 31, 1978, abandoned.

[51] Int. Cl.$^3$ ............... C08F 210/06; C08F 210/08
[52] U.S. Cl. ............... 526/348.6; 264/328.1; 264/310; 526/348; 526/348.2
[58] Field of Search ............ 526/124, 125, 348, 348.2, 526/348.3, 348.4, 348.5, 348.6, 348.7; 264/310, 311, 312, 328.1, 328.7, 328.8, 328.12, 328.13, 328.14, 328.16, 328.17

[56] References Cited

U.S. PATENT DOCUMENTS

| B 632,416 | 3/1976 | Anderson et al. . | |
|---|---|---|---|
| 2,839,515 | 6/1958 | Davison | 526/348 |
| 3,073,809 | 1/1963 | Kluiber | 526/348.5 |
| 3,152,088 | 10/1964 | Sandri et al. | 252/429 |
| 3,168,484 | 2/1965 | Engel et al. | 252/429 |
| 3,288,720 | 11/1966 | Moretti et al. | 252/429 |
| 3,544,518 | 12/1970 | Bodkins | 264/328.16 |
| 3,594,330 | 7/1971 | Delbouille et al. | 252/429 |
| 3,642,746 | 2/1972 | Kashiwa | 526/125 |
| 3,645,992 | 2/1972 | Elston | 526/348.2 |
| 3,663,450 | 5/1972 | Cozewith et al. | 252/429 |
| 3,864,278 | 2/1975 | LaHeij et al. | 252/429 |
| 3,865,749 | 2/1975 | Tornquist et al. | 252/429 |
| 3,888,835 | 6/1975 | Ito | 526/125 |
| 3,914,342 | 10/1975 | Mitchell . | |
| 3,920,621 | 11/1975 | Baxmann | 526/348.7 |
| 3,925,338 | 12/1975 | Ort | 252/429 |
| 4,013,823 | 3/1977 | Longi et al. | 526/116 |
| 4,029,729 | 6/1977 | Rees | 264/310 |
| 4,035,560 | 7/1977 | Caumartin | 526/124 |
| 4,076,698 | 2/1978 | Anderson | 526/348.6 |
| 4,104,198 | 8/1978 | May, Jr. et al. . | |
| 4,107,413 | 8/1978 | Giannini | 526/124 |
| 4,107,414 | 8/1978 | Giannini | 526/125 |
| 4,107,415 | 8/1978 | Giannini | 526/124 |
| 4,115,508 | 9/1978 | Hughes | 264/310 |
| 4,120,820 | 10/1978 | Birkelbach . | |
| 4,143,223 | 3/1979 | Toyota | 526/124 |
| 4,163,831 | 8/1979 | Gessell . | |
| 4,172,050 | 10/1979 | Gessell . | |

FOREIGN PATENT DOCUMENTS

| 842254 | 11/1976 | Belgium . |
| 669693 | 9/1963 | Canada . |
| 1011045 | 5/1977 | Canada . |
| 1011047 | 5/1977 | Canada . |
| 1258984 | 1/1972 | United Kingdom . |
| 1502567 | 3/1978 | United Kingdom . |
| 1502883 | 3/1978 | United Kingdom . |

*Primary Examiner*—Paul R. Michl
*Attorney, Agent, or Firm*—John S. Piscitello

[57] ABSTRACT

An article molded from ethylene hydrocarbon copolymers, which articles have superior stress crack resistance and low temperature toughness.

11 Claims, 1 Drawing Figure

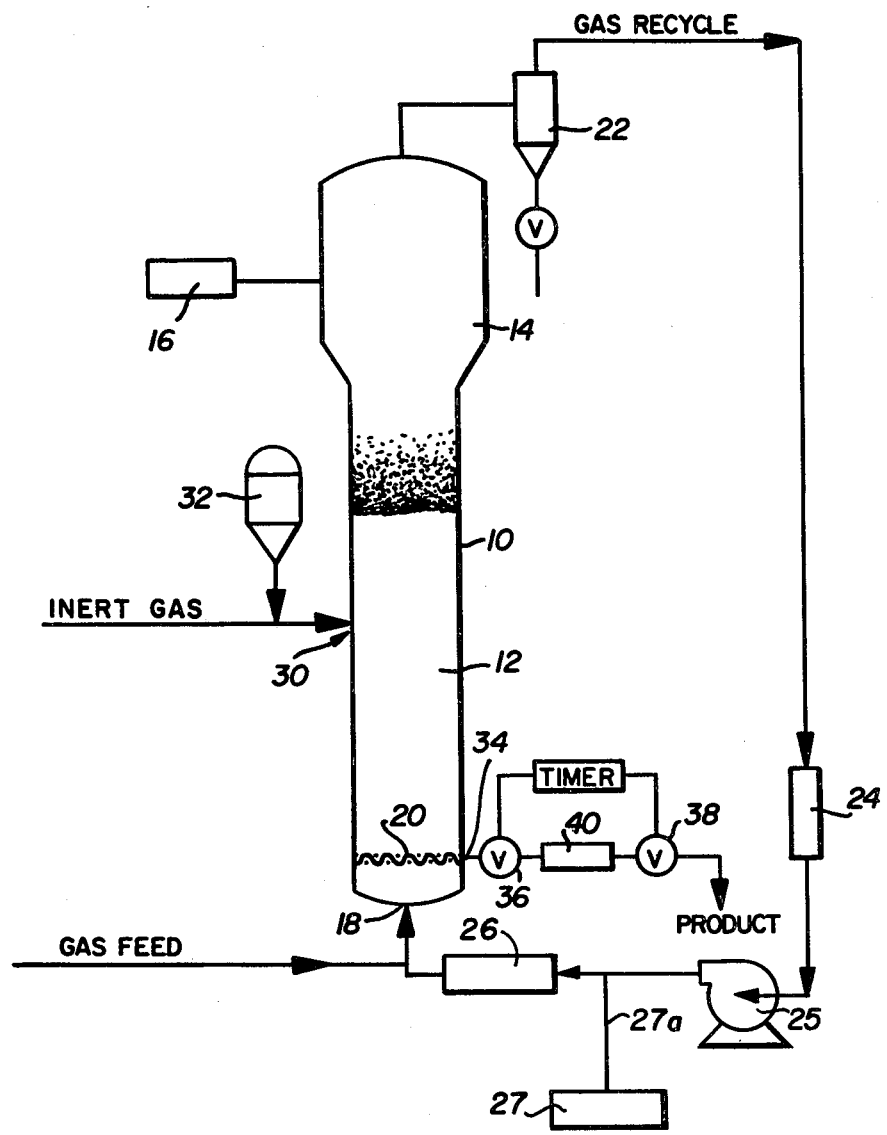

ARTICLE MOLDED FROM ETHYLENE HYDROCARBON COPOLYMER

This application is a Continuation-In-Part of copending application Ser. No. 892,323 filed Mar. 31, 1978, now abandoned.

BACKGROUND OF THE INVENTION

1. Field of the Invention

This invention relates to an article molded from ethylene hydrocarbon copolymers.

2. Description of the Prior Art.

There is currently a need for molded plastic articles such as, for example, lids, closures, food and garbage containers, bottles, dishpans and toys which provide stress crack resistance when in contact with detergents, vegetable oils and fats and/or which have superior impact strength at low temperatures (i.e. $\leq 0°$ C.).

Attempts have been made to mold these articles from high pressure ethylene homopolymers or from blends of high density polyethylene and copolymers of ethylene and polar comonomers such as vinyl acetate or ethyl acrylate.

However, the articles molded from high pressure polyethylenes have insufficient stress crack resistance and low temperature impact strength. The polar copolymer blends with high density polyethylene, though better than the high pressure polyethylenes in these properties, are very expensive to produce, are less translucent, have more odor, poorer electrical properties, a high hexane extractable level and are more prone to exhibit color segregation when compounded with pigments.

SUMMARY OF THE INVENTION

It has now been unexpectedly found that articles molded from ethylene hydrocarbon copolymers have superior stress crack resistance and low temperature properties.

Additionally, articles injection molded from ethylene hydrocarbon copolymers have high surface gloss and are free from dull swirls. Further, articles molded from said copolymers have excellent flex life particularly when flexed across the direction of orientation.

An object of the present invention is to provide molded articles of ethylene hydrocarbon copolymers having superior stress crack resistance and low temperature properties.

A further object of the present invention is to provide articles injection molded from ethylene hydrocarbon copolymers of high gloss and essentially free from dull swirls.

Another object of the present invention is to provide articles molded from ethylene hydrocarbon copolymer which have low warpage.

Another object of the present invention is to provide articles molded from ethylene hydrocarbon copolymer of superior flex life.

DESCRIPTION OF THE DRAWING

FIG. 1 shows a fluid bed reactor in which the ethylene hydrocarbon copolymers herein may be prepared.

DESCRIPTION OF THE PREFERRED EMBODIMENT

It has now been found that articles molded from ethylene hydrocarbon copolymers have superior stress crack resistance, low temperature properties and flex life, have high gloss, low warpage and are essentially free from dull swirls.

The Ethylene Copolymers

The copolymers which may be used in the process of the present invention are copolymers of a major mol percent ($\geq 90\%$) of ethylene, and a minor mol percent ($\leq 10\%$) of one or more $C_3$ to $C_8$ alpha olefins. The $C_3$ to $C_8$ alpha olefins should not contain any branching on any of their carbon atoms which is closer than the fourth carbon atom. These alpha olefins include propylene, butene-1, pentene-1, hexene-1, 4-methyl pentene-1, heptene-1, and octene-1. The preferred alpha olefins are propylene, butene-1, hexene-1, 4-methyl pentene-1, and octene-1.

The copolymers have a melt flow ratio of $\geq 22$ to $\leq 32$, and preferably of 24 25 to $\leq 30$. The melt flow ratio value is another means of indicating the molecular weight distribution of a polymer. The melt flow ratio (MFR) range of $\geq 22$ to $\leq 32$ thus corresponds to a $M_w/M_n$ value range of about 2.7 to 4.1 and the MFR range of $\geq 25$ to $\leq 30$ corresponds to a Mw/Mn range of about 2.8 to 3.6.

The melt index of a copolymer is a reflection of its molecular weight. Polymers having a relatively high molecular weight, have a relatively low melt index. Ultrahigh molecular weight ethylene polymers have a high load (HLMI) melt index of about 0.0 and very high molecular weight polymers having a high load melt index (HLMI) of about 0.0 to about 1.0. Such high molecular weight polymers are difficult, if not impossible, to mold in conventional injection molding equipment. The polymers used in the present invention, on the other hand, can be readily molded in such equipment. They have a standard or normal load melt index of $\geq 0.0$ to about 100, and preferably of about 0.5 to 80, and a high load melt index (HLMI) of about 11 to about 2000. The melt index of the copolymers which are used in the present invention is a function during the polymerization process in which they are made, as described herein, of a combination of the polymerization temperature of the reaction, the density of the copolymer and the hydrogen/monmer ratio in the reaction system. Thus, the melt index is raised by increasing the polymerization temperature and/or by decreasing the density of the polymer and/or by increasing the hydrogen/monomer ratio. In addition to hydrogen, other chain transfer agents such as dialkyl zinc compounds may also be used to further increase the melt index of the copolymers.

The copolymers of the present invention have an unsaturated group content of $\leq 1$, and usually of $\geq 0.1$ to $\geq 0.3$, C$=$C/1000 carbon atoms.

The copolymers of the present invention have a n-hexane extractables content (at 50° C.) of less than about 3, and preferably, of less than about 2 weight percent.

The copolymers of the present invention have a residual catalyst content, in terms of parts per million of titanium metal, of the order of $>0$ to $\leq 20$ parts per million, (ppm) at a productivity level of $\geq 50,000$ and of the order of $>0$ to $\leq 10$ ppm at a productivity level of $\geq 100,000$ and of the order of $>0$ to $\leq 3$ parts per millin at a productivity level of $<300,000$. In terms of Cl, Br or I residues, the copolymers of the present invention have a Cl, Br or I residue content which depends upon the Cl, Br or I content of the precursor. From the Ti to Cl, Br or I ratio in the initial precursor, it is possible to calculate Cl, Br, or I residues from knowledge of the productivity level based on titanium residue only. For many of the copolymers of the present invention made only with Cl containing components of the catalyst system (Cl/Ti=7), one can calculate a Cl residue content of $>0$ to $\leqq 140$ ppm at a productivity of $\geqq 50,000$, a Cl content of $>0$ to $\leqq 70$ ppm at a productivity of $\geqq 100,000$, and a Cl content of $>0$ to $\leqq 20$ ppm at a productivity of $\geqq 300,000$. The copolymers are readily produced in the process of the present invention at productivities of up to about 1,000,000.

The copolymers of the present invention are granular materials which have an average particle size of the order of about 0.005 to about 0.07 inches, and preferably, of about 0.02 to about 0.04 inches in diameter. The particle size is important for the purposes of readily fluidizing the polymer particles in the fluid bed reactor, as described below. The copolymers of the present invention have a bulk density of about 15 to 31 pounds per cubic foot.

For the molding of articles, such as lids, closures, food and garbage containers, dishpans, hinges and toys, which must have excellent stress crack resistance and/or low temperature toughness, gloss or long flex life, the preferred copolymers of the present invention are those having a density of $\geqq 0.918$ to $\leqq 0.935$, a molecular weight distribution Mw/Mn of 2.7 to 4.1, a standard melt index of 1 to 100 and preferably of about 7 to 80 and secant modulus of 30,000 to 80,000 psi.

Copolymer Preparation

The copolymers used in the present invention may be produced in accordance with procedures as set forth in U.S. Pat. No. 4,302,566 in the names of F. J. Karol et al and entitled "Preparation of Ethylene Copolymers In Fluid Bed Reactor" and hereinafter described, and the procedures set forth in U.S. Pat. No. 4,302,565 in the names of G. L. Goeke et al and entitled "Impregnated Polymerization Catalyst, Process For Preparing, and Use for Ethylene Copolymerization," as well as procedures set forth below which will produce ethylene hydrocarbon copolymers with the properties as heretofore described.

The copolymers can be readily produced in a low pressure gas phase fluid bed reaction process, as disclosed below, if the monomer charge is polymerized under a specific set of operating conditions, as disclosed below, and in the presence of a specific high activity catalyst, which is also described below.

High Activity Catalyst

The compounds used to form the high activity catalyst used to make the copolymers employed in the present invention comprise at least one titanium compound, at least one magnesium compound, at least one electron donor compound, at least one activator compound, and at least one inert carrier material, as defined below.

The titanium compound has the structure $Ti(OR)_aX_b$ wherein R is a $C_1$ to $C_{14}$ aliphatic or aromatic hydrocarbon radical, or COR' where R' is a $C_1$ to $C_{14}$ aliphatic or aromatic hydrocarbon radical, X is selected from the group consisting of Cl, Br, I, or mixtures thereof, a is 0 or 1, b is 2 to 4 inclusive and $a+b=3$ or 4.

The titanium compounds can be used individually or in combinations thereof, and would include $TiCl_3$ and $TiCl_4$, $Ti(OCH_3)Cl_3$, $Ti(OC_6H_5)Cl_3$, $Ti(OCOCH_3)Cl_3$ and $Ti(OCOC_6H_5)Cl_3$.

The magnesium compound has the structure $MgX_2$ wherein X is selected from the group consisting of Cl, Br, I, or mixtures thereof. Such magnesium compounds can be used individually or in combinations thereof and would include $MgCl_2$, $MgBr_2$ and $MgI_2$. Anhydrous $MgCl_2$ is the particularly preferred magnesium compound.

About 0.5 to 56, and preferably about 1 to 10, mols of the magnesium compound are used per mol of the titanium compound in preparing the catalysts employed in the present invention.

The titanium compound and the magnesium compound should be used in a form which will facilitate their dissolution in the electron donor compound, as described herein below.

The electron donor compound is an organic compound which is liquid at 25° C. and in which the titanium compound and the magnesium compound are partially or completely soluble. The electron donor compounds are known as such, or as Lewis bases.

The electron donor compounds would include such compounds as alkyl esters of aliphatic and aromatic carboxylic acids, aliphatic ethers, cyclic ethers and aliphatic ketones. Among these electron donor compounds the preferable ones are alkyl esters of $C_1$ to $C_4$ saturated aliphatic carboxylic acids; alkyl esters of $C_7$ to $C_8$ aromatic carboxylic acids; $C_2$ to $C_8$, and preferably $C_3$ to $C_4$, aliphatic ethers; $C_3$ to $C_4$ cyclic ethers, and preferably $C_4$ cyclic mono- or di-ether; $C_3$ to $C_6$, and preferably $C_3$ to $C_4$, aliphatic ketones. The most preferred of these electron donor compounds would include methyl formate, ethyl acetate, butyl acetate, ethyl ether, hexyl ether, tetrahydrofuran, dioxane, acetone and methyl isobutyl ketone.

The electron donor compounds can be used individually or in combinations thereof.

About 2 to 85, and preferably about 3 to 10 mols of the electron donor compound are used per mol of Ti.

The activator compound has the structure $Al(R'')_cX'_dH_e$ wherein X' is Cl or OR''', R'' and R''' are the same or different and are $C_1$ to $C_{14}$ saturated hydrocarbon radicals, d is 0 to 1.5, e is 1 or 0 and $c+d+e=3$.

Such activator compounds can be used individually or in combinations thereof and would include $Al(C_2H_5)_3$, $Al(C_2H_5)Cl$, $Al(i-C_4H_9)_3$, $Al_2(C_2H_5)_3Cl_3$, $Al(i-C_4H_9)_2H$, $Al(C_6H_{13})_3$, $Al(C_8H_{17})_3$, $Al(C_2H_5)_2H$ and $Al(C_2H_5)_2(OC_2H_5)$.

About 10 to 400, and preferably about 10 to 100, mols of the activator compound are used per mol of the titanium compound in activating the catalyst employed to make the copolymers used in the present invention.

The carrier materials are solid, particulate materials which are inert to the other components of the catalyst composition, and to the other active components of the reaction system. These carrier materials would include inorganic materials such as oxides of silicon and aluminum and molecular sieves, and organic materials such as olefin polymers such as polyethylene. The carrier materials are used in the form of dry powders having an average particle size of about 10 to 250, and preferably of about 50 to 150 microns. These materials are also preferably porous and have a surface area of $\geq 3$, and preferably of $\geq 50$, square meters per gram. The carrier material should be dry, that is, free of absorbed water. Drying of the carrier material is carried out by heating it at a temperature of $\geq 600°$ C. Alternatively, the carrier material dried at a temperature of $\geq 200°$ C. may be treated with about 1 to 8 weight percent of one or more of the aluminum alkyl compounds described above. This modification of the support by the aluminum alkyl compounds provides the catalyst composition with increased activity and also improves polymer particle morphology of the resulting ethylene polymers.

Catalyst Preparation

The catalyst used in the present invention is prepared by first preparing a precursor composition from the titanium compound, the magnesium compound, and the electron donor compound in one or more steps as described below, and by then treating the precursor composition with the carrier material and the activator compound in one or more steps as described below.

The precursor composition is formed by dissolving the titanium compound and the magnesium compound in the electron donor compound at a temperature of about 20° C. up to the boiling point of the electron donor compound. The titanium compound can be added to the electron donor compound before or after the addition of the magnesium compound, or concurrent therewith. The dissolution of the titanium compound and the magnesium compound can be facilitated by stirring, and, in some instances by refluxing, these two compounds in the electron donor compound. When the titanium compound and the magnesium compound are dissolved, the precursor composition is isolated by crystallization or by precipitation with a $C_5$ to $C_8$ aliphatic or aromatic hydrocarbon such as hexane, isopentane or benzene.

The crystallized or precipitated precursor composition is isolated in the form of fine, free flowing particles having an average particle size of about 10 to 100 microns and a settled bulk density of about 18 to 33 pounds per cubic foot.

Particle sizes of $\geq 100\mu$ are preferred for use in a fluid bed process. The particle size of the isolated precursor composition can be controlled by the rate of crystallization or precipitation.

When thus made as disclosed above, the precursor composition has the formula

$$Mg_mTi_1(OR)_nX_p[ED]_q$$

wherein ED is the electron donor compound, m is $\geq 0.5$ to $\leq 56$, and preferably $\geq 1.5$ to $\leq 5.0$, n is 0 to 1, p is $\geq 6$ to $\leq 116$, and preferably $\geq 6$ to $\leq 14$, q is $\geq 2$ to $\leq 85$, and preferably $\geq 4$ to $\leq 11$, R is a $C_1$ to $C_{14}$ aliphatic or aromatic hydrocarbon radical, or COR' wherein R' is a $C_1$ to $C_{14}$ aliphatic or aromatic hydrocarbon radical and, X is selected from the group consisting of Cl, Br, I, or mixtures thereof.

The subscript for the element titanium (Ti) is the arabic numeral one.

The polymerization activity of the completely activated catalyst is so high, in the polymerization process described herein that a dilution of the precursor composition with the carrier material is necessary in order to effectively control the reaction rate. The dilution of the precursor composition can be accomplished before the precursor composition is partially or completely activated, as disclosed below, or concurrent with such activation. The dilution of the precursor composition is accomplished by mechanically mixing or blending about 0.033 to 1, and preferably about 0.1 to 0.33, parts of the precursor composition with one part by weight of the carrier material.

In order to be used to make the copolymers of the present invention in the polymerization process described herein the precursor composition must be fully or completely activated, that is, it must be treated with sufficient activator compound to transform the Ti atoms in the precursor composition to an active state. It has been found, however, that the manner of activating the catalyst is very critical in order to obtain an active material, even when an inert carrier is present. Attempts to activate the catalyst by a process similar to that of U.S. Pat. No. 3,989,881, for example, wherein the total amount of reducing agent theoretically needed to fully activate the catalyst was added to the precursor composition in a hydrocarbon slurry, followed by drying of the slurry at temperatures of $\geq 20°$ to $\leq 80°$ C. to remove the solvent therefrom to facilitate the use of the catalyst in a gas phase process, produced a product which was not sufficiently active in the gas phase fluid bed process otherwise described below for commercial purposes.

It has been found that, in order to prepare a useful catalyst, it is necessary to conduct the activation in such a way that, at least, the final activation stage must be conducted in the absence of solvent so as to avoid the need for drying the fully active catalyst to remove solvent therefrom. Two procedures have been developed to accomplish this result. In one procedure, the precursor composition is completely activated, outside the reactor, in the absence of solvent, by dry blending the precursor composition with the activator compound. In this dry blending procedure the activator compound is preferably used while absorbed on a carrier material. This procedure has a disadvantage, however, in that the resulting dry, fully activated catalyst is pyrophoric where it contains >10 weight percent of the activator compound.

In the second, and preferred, of such catalyst activation procedures, the precursor composition is partially activated outside the polymerization reactor with activator compound in a hydrocarbon slurry, the hydrocarbon solvent is removed by drying and the partially activated precursor composition is fed to the polymerization reactor where the activation is completed with additional activator compound.

Thus, in the dry blending catalyst making procedure the solid particulate precursor composition is added to and evenly blended with solid particles of porous carrier material wherein the activator compound is absorbed. The activator compound is absorbed on the carrier material, from a hydrocarbon solvent solution of the activator compound, so as to provide a loading of about 10 to 50 weight percent of activator compound on 90 to 50 weight percent of carrier material. The amounts of the precursor composition, activator compound and carrier material that are employed are such as to provide the desired Al/Ti molar ratios and to provide a final composition having a weight ratio of precursor composition to carrier material of less than about 0.50, and preferably of less than about 0.33. This amount of carrier material thus provides the necessary dilution therewith of the activated catalyst so as to provide the desired control of the polymerization activity of the catalyst in the reactor. Where the final compositions contain about >10 weight percent of the activator compound, they will be pyrophoric. During the dry blending operation, which may be conducted at ambient (25° C.) or lower temperatures, the dry mixture is well agitated to avoid any heat build-up during the ensuing reduction reaction which is exothermic, initially. The resulting catalyst is thus completely reduced and activated and can be fed to, and used as such in, the polymerization reactor. It is a free-flowing particulate material.

In the second, and preferred catalyst activation procedure, the activation is conducted in at least two stages. In the first stage the solid particulate precursor composition, diluted with carrier material, is reacted with and partially reduced by enough activator compound so as to provide a partially activated precursor composition which has an activator compound/Ti molar ratio of about 1 to 10:1 and preferably of about 4 to 8:1. This partial activation reaction is preferably carried out in a hydrocarbon slurry followed by drying of the resulting mixture, to remove the solvent, at temperatures between 20 to 80, and preferably of 50 to 70 C. The resulting product is a freeflowing solid particulate material which can be readily fed to the polymerization reactor. The partially activated precursor composition, however, is, at best, weakly active as a polymerization catalyst in the polymerization process described herein. In order to render the partially activated precursor composition active for ethylene polymerization purposes, additional activator compound must also be added to the polymerization reactor to complete, in the reactor, the activation of the precursor composition. The additional activator compound and the partially activated precursor composition are preferably fed to the reactor through separate feed lines. The additional activator compound may be sprayed into the reactor in the form of a solution thereof in a hydrocarbon solvent such as isopentane, hexane, or mineral oil. This solution usually contains about 2 to 30 weight percent of the activator compound. The activator compound may also be added to the reactor in solid form, by being absorbed on a carrier material. The carrier material usually contains 10 to 50 weight percent of the activator for this purpose. The additional activator compound is added to the reactor in such amounts as to provide, in the reactor, with the amounts of activator compound and titanium compound fed with the partially activated precursor composition, a total Al/Ti molar ratio of about 10 to 400 and preferably of about 15 to 60. The additional amounts of activator compound added to the reactor, react with, and complete the activation of, the titanium compound in the reactor.

In a continuous gas phase process, such as the fluid bed process disclosed below, discrete portions of the partially or completely activated precursor composition are continuously fed to the reactor with any additional activator compound needed to complete the activation of the partially activated precursor composition, during the continuing polymerization process in order to replace active catalyst sites that are expended during the course of the process

The Polymerization Reaction

The polymerization reaction is conducted by contacting a stream of the monomers, in a gas phase process, such as in the fluid bed process described below, and substantially in the absence of catalyst poisons such as moisture, oxygen, CO, $CO_2$, and acetylene with a catalytically effective amount of the completely activated precursor composition (the catalyst) at a temperature and at a pressure sufficient to initiate the polymerization reaction.

In order to achieve the desired density ranges in the copolymers it is necessary to copolymerize enough of the $\geq C_3$ comonomers with ethylene to achieve a level of $\geq 1$ to 10 mol percent of the $C_3$ to $C_8$ comonomer in the copolymer. The amount of comonomer needed to achieve this result will depend on the particular comonomer(s) employed.

There is provided below a listing of the amounts, in mols, of various comonomers that must be copolymerized with ethylene in order to provide polymers having the desired density range at any given melt index. The listing also indicates the relative molar concentration, of such comonomer to ethylene, which must be present in the gas stream of monomers which is fed to the reactor.

| Comonomer | mol % needed in copolymer | Gas Stream Comonomer/Ethylene molar ratio |
|---|---|---|
| propylene | 3.0 to 10 | 0.2 to 0.9 |
| butene-1 | 2.5 to 7.0 | 0.2 to 0.7 |
| pentene-1 | 2.0 to 6.0 | 0.15 to 0.45 |
| hexene-1 | 1.0 to 5.0 | 0.12 to 0.4 |
| octene-1 | 0.8 to 4.5 | 0.10 to 0.35 |

A fluidized bed reaction system which can be used to make the the copolymers of the present invention is illustrated in FIG. 1. With reference thereto the reactor 10 consists of a reaction zone 12 and a velocity reduction zone 14.

The reaction zone 12 comprises a bed of growing polymer particles, formed polymer particles and a minor amount of catalyst particles fluidized by the continuous flow of polymerizable and modifying gaseous components in the form of make-up feed and recycle gas through the reaction zone. To maintain a viable fluidized bed, the mass gas flow rate through the bed must be above the minimum flow required for fluidization, and preferably from about 1.5 to about 10 times $G_{mf}$ and more preferably from about 3 to about 6 times $G_{mf}$. $G_{mf}$ is used in the accepted form as the abbreviation for the minimum mass gas flow required to achieve fluidization, C. Y. Wen and Y. H. Yu, "Mechanics of Fluidization", Chemical Engineering Progress Symposium Series, Vol. 62, P. 100–111 (1966).

It is essential that the bed always contains particles to prevent the formation of localized "hot spots" and to entrap and distribute the particulate catalyst throughout the reaction zone. On start up, the reaction zone is usually charged with a base of particulate polymer particles before gas flow is initiated. Such particles may be identical in nature to the polymer to be formed or different therefrom. When different, they are withdrawn with the desired formed polymer particles as the first product. Eventually, a fluidized bed of the desired polymer particles supplants the start-up bed.

The partially or completely activated precursor compound (the catalyst) used in the fluidized bed is preferably stored for service in a reservoir 32 under a blanket of a gas which is inert to the stored material, such as nitrogen and argon.

Fluidization is achieved by a high rate of gas recycle to and through the bed, typically in the order of about 50 times the rate of feed of make-up gas. The fluidized bed has the general appearance of a dense mass of viable particles in possible free-vortex flow as created by the percolation of gas through the bed. The pressure drop through the bed is equal to or slightly greater than the mass of the bed divided by the crosssectional area. It is thus dependent on the geometry of the reactor.

Make-up gas is fed to the bed at a rate equal to the rate at which particulate polymer product is withdrawn. The composition of the make-up gas is determined by a gas analyzer 16 positioned above the bed. The gas analyzer determines the composition of the gas being recycled and the composition of the make-up gas is adjusted accordingly to maintain an essentially steady state gaseous composition within the reaction zone.

To insure complete fluidization, the recycle gas and, where desired, part of the make-up gas are returned to the reactor at point 18 below the bed. There exists a gas distribution plate 20 above the point of return to aid fluidizing the bed.

The portion of the gas stream which does not react in the bed constitutes the recycle gas which is removed from the polymerization zone, preferably by passing it into a velocity reduction zone 14 above the bed where entrained particles are given an opportunity to drop back into the bed. Particle return may be aided by a cyclone 22 which may be part of the velocity reduction zone or exterior thereto. Where desired, the recycle gas may then be passed through a filter 24 designed to remove small particles at high gas flow rates to prevent dust from contracting heat transfer surfaces and compressor blades.

The recycle gas is then compressed in a compressor 25 and then passed through a heat exchanger 26 wherein it is stripped of heat of reaction before it is returned to the bed. By constantly removing heat of reaction, no noticeable temperature gradient appears to exist within the upper portion of the bed. A temperature gradient will exist in the bottom of the bed in a layer of about 6 to 12 inches, between the temperature of the inlet gas and the temperature of the remainder of the bed. Thus, it has been observed that the bed acts to almost immediately adjust the temperature of the recycle gas above this bottom layer of the bed zone to make it conform to the temperature of the remainder of the bed thereby maintaining itself at an essentially constant temperature under steady state conditions. The recycle is then returned to the reactor at its base 18 and to the fluidized bed through distribution plate 20. The compressor 25 can also be placed downstream of the heat exchanger 26.

The distribution plate 20 plays an important role in the operation of the reactor. The fluidized bed contains growing and formed particulate polymer particles as well as catalyst particles. As the polymer particles are hot and possibly active, they must be prevented from settling, for if a quiescent mass is allowed to exist, any active catalyst contained therein may continue to react and cause fusion. Diffusing recycle gas through the bed at a rate sufficient to maintain fluidization at the base of the bed is, therefore, important. The distribution plate 20 serves this purpose and may be a screen, slotted plate, perforated plate, a plate of the bubble cap type, and the like. The elements of the plate may all be stationary, or the plate may be of the mobile type disclosed in U.S. Pat. No. 3,298,792. Whatever its design, it must diffuse the recycle gas through the particles at the base of the bed to keep them in a fluidized condition, and also serve to support a quiescent bed of resin particles when the reactor is not in operation. The mobile elements of the plate may be used to dislodge any polymer particles entrapped in or on the plate.

Hydrogen may be used as a chain transfer agent in the polymerization reaction disclosed herein. the ratio of hydrogen/ethylene employed will vary between about 0 to about 2.0 moles of hydrogen per mole of the monomer in the gas stream.

Any gas inert to the catalyst and reactants can also be present in the gas stream. The activator compound is preferably added to the reaction system at the hottest portion of the gas which is usually downstream from heat exchanger 26. Thus, the activator may be fed into the gas recycle system from dispenser 27 thru line 27A.

Compounds of the structure $Zn(R_a)(R_b)$, wherein $R_a$ and $R_b$ are the same or different $C_1$ to $C_{14}$ aliphatic or aromatic hydrocarbon radicals, may be used in conjunction with hydrogen, with the catalysts disclosed herein as molecular weight control or chain transfer agents, that is, to increase the melt index values of the copolymers that are produced. About 0 to 50, and preferably about 20 to 30, mols of the Zn compound (as Zn) would be used in the gas stream in the reactor per mol of titanium compound (as Ti) in the reactor. The zinc compound would be introduced into the reactor preferably in the form of a dilute solution (2 to 30 weight percent) in hydrocarbon solvent or absorbed on a solid diluent material, such as silica, of the types described above, in amounts of about 10 to 50 weight percent. These compositions tend to be pyrophoric. The zinc compound may be added alone, or with any additional portions of the activator compound that are to be added to the reactor from a feeder, not shown, which could be positioned adjacent dispenser 27, near the hottest portion of the gas recycle system.

It is essential to operate the fluid bed reactor at a temperature below the sintering temperature of the polymer particles. To insure that sintering will not occur, operating temperatures below the sintering temperature are desired. For the production of ethylene copolymers of the present invention an operating temperature of about 30° to 115° C. is preferred, and a temperature of about 75° to 95° C. is most preferred. Temperatures of 75° to 95° C. are used to prepare products having a density of about 0.91 to 0.92, and temperatures of about 80° to 100° C. are used to prepare products having a density of about >0.92 to 0.94.

The fluid bed reactor is operated at pressures of up to about 1000 psi, and is preferably operated at a pressure of from about 150 to 350 psi, with operation at the higher pressures in such ranges favoring heat transfer since an increase in pressure increases the unit volume heat capacity of the gas.

The partially or completely activated precursor composition is injected into the bed at a rate equal to its consumption at a point 30 which is above the distribution plate 20. Injecting the catalyst at a point above the distribution plate is an important feature of this invention. Since the catalysts used in the practice of the polymerization process described herein are highly active, injection of the fully activated catalyst into the area below the distribution plate may cause polymerization to begin there and eventually cause plugging of the distribution plate. Injection into the viable bed, instead, aids in distributing the catalyst throughout the bed and tends to preclude the formation of localized spots of high catalyst concentration which may result in the formation of "hot spots".

A gas which is inert to the catalyst such as nitrogen or argon is used to carry the partially or completely reduced precursor composition, and any additional activator compound or non-gaseous chain transfer agent that is needed, into the bed.

The production rate of the bed is controlled by the rate of catalyst injection. The production rate may be increased by simply increasing the rate of catalyst injection and decreased by reducing the rate of catalyst injection.

Since any change in the rate of catalyst injection will change the rate of generation of the heat of reaction, the temperature of the recycle gas is adjusted upwards or downwards to accomodate the change in rate of heat generation. This insures the maintenance of an essentially constant temperature in the bed. Complete instrumentation of both the fluidized bed and the recycle gas cooling system, is, of course, necessary to detect any temperature change in the bed so as to enable the operator to make a suitable adjustment in the temperature of the recycle gas.

Under a given set of operating conditions, the fluidized bed is maintained at essentially a constant height by withdrawing a portion of the bed as product at a rate equal to the rate of formation of the particulate polymer product. Since the rate of heat generation is directly related to product formation, a measurement of the temperature rise of the gas across the reactor (the difference between inlet gas temperature and exit gas temperature) is determinative of the rate of particulate polymer formation at a constant gas velocity.

The particulate polymer product is preferably continuously withdrawn at a point 34 at or close to the distribution plate 20 and in suspension with a portion of the gas stream which is vented before the particles settle to preclude further polymerization and sintering when the particles reach their ultimate collection zone. The suspending gas may also be used, as mentioned above, to drive the product of one reactor to another reactor.

The particulate polymer product is conveniently and preferably withdrawn through the sequential operation of a pair of timed valves 36 and 38 defining a segregation zone 40. While valve 38 is closed, valve 36 is opened to emit a plug of gas and product to the zone 40 between it and valve 36 which is then closed. Valve 38 is then opened to deliver the product to an external recovery zone. Valve 38 is then closed to await the next product recovery operation.

Finally, the fluidized bed reactor is equipped with an adequate venting system to allow venting the bed during start up and shut down. The reactor does not require the use of stirring means and/or wall scraping means.

The highly active supported catalyst system described herein appears to yield a fluid bed product having an average particle size between about 0.005 to about 0.07 inches and preferably about 0.02 to about 0.04 inches.

The feed stream of gaseous monomer, with or without inert gaseous dilutents, is fed into the reactor at a space time yield of about 2 to 10 pounds/hour/cubic foot of bed volume.

The term virgin resin or polymer as used herein means polymer, in granular form, as it is recovered from the polymerization reactor.

Additives such as fillers, pigments, stabilizers, antioxidants, lubricants, flame retardants, UV absorbers, plasticizers, foaming agents, etc., may be added to the copolymers herein in amounts which will produce the intended effect.

Processing

The articles of the present invention are produced by methods will known in the art, as by injection molding, rotomolding and blow molding.

Articles such as lids, closures, food or garbage containers, dishpans and toys are produced by ram or screw injection molding processes well known in the art. For example, Renfrew & Morgan, "Polythene", second edition, Interscience Publisher, (1960) pages 549-570 describes injection molding of polyethylene. The articles of the present invention are molded in a standard injection molding machine where the copolymer is heated at a temperature of from about 180° to 270° C. in the machine until plasticized and is then injected at a gauge pressure of from about 500 to about 2000 psi into a mold cavity of desired configuration. The copolymer is cooled in the mold cavity at temperatures of from about 15° to about 60° until it conforms to the shape of the mold cavity. The molded article is then removed from the mold.

Articles such as bottles and containers are molded by injection or extrusion blow molding processes which are well known in the prior art. For example, Renfrow & Morgan, supra, pages 571 to 579, describe blow molding of polyethylene. In blow molding, the copolymer is heated as previously described in the machine and the resin is then injected into a mold cavity kept at a temperature near the melting point of the resin preferably from about 80° to about 120° C., and formed into a tubular shape called a parison which is then transferred to another cooler mold of desired shape and forced under air pressure against the walls of the mold cavity and cooled. The article is then removed from the mold.

Extrusion blow molding consists of, for example, extruding a length of tube of the copolymer into a split mold which is then closed to seal the tube at either top or bottom. The tube is then inflated to the internal contour of the mold, for example, by air pressure introduced into the extrudate. The molding is then cooled, the mold opened and the component ejected.

Articles such as large toys and industrial size food and garbage containers are principally made by rotomolding instead of injection molding, because of the intricate shapes involved and the superior economics the process offers for low volume production.

The process of rotomolding is well known in the art and is described in "Encyclopedia of Polymer Science and Technology", Volume 9, Interscience Publisher, 1968, pages 118-137.

In this process either powdered resin or fine resin particles are placed into the metal mold cavity which is then rotated in a hot oven (500° to 600° F.) until the resin melts and coats the inside of the mold cavity. The metal mold containing the molten resin is then transferred to a cooling means wherein it is cooled until the molten resin has solidified and conformed to the shape of the mold cavity.

Before processing according to the methods heretofore described, the copolymer may be mixed or blended with various additives and then added to the molding machine or the copolymer may be added directly to the molding machine together with any additives.

Articles

The shaped articles of the present invention molded from ethylene hydrocarbon copolymers include lids, closures, food and garbage containers, dishpans, bottles, toys, hinges, etc.

The articles of the present invention may be subjected to any further treatment such as coating, painting, etc. as desired, depending upon the ultimate use of the article.

EXAMPLES

The following examples are designed to illustrate the articles of the present invention and their formation and are not intended as a limitation on the scope thereof.

The properties of the polymers herein were determined by the following test methods.

| | |
|---|---|
| Density | ASTM D-1505 - Plaque is conditioned for one hour at 100° C. to approach equilibrium crystallinity-Reported as grams per cubic centimeter (g/cm$^3$): All density measurements are made in a density gradient column. |
| Melt Index (MI) | ASTM D-1238 - Condition E-measured at 190° C. - reported as grams per 10 minutes. |
| Flow Rate (HLMI) | ASTM D-1238 - Condition F measured at 10 times the weight used in the melt index test above |
| Melt Flow Ratio (MFR) | = Flow Rate/Melt Index |
| Molecular Weight Distribution, Mw/Mn | Gel Permeation Chromatography Styragel Packing: Pore size packing sequence is 10$^7$, 10$^5$, 10$^4$, 10$^3$, 60A°. Solvent: Perchloroethylene at 117° C. Detection: Infrared at 3.45 $\mu$m |
| Unsaturation | Infrared Spectrophotometer (Perkin Elmer Model 21) Pressings 25 mils in thickness are used. Absorbance is measured at 10.35 $\mu$m for trans vinylene; 11.00 $\mu$m for terminal vinyl, and 11.25 $\mu$m for pendant vinylidene. The absorbance per mil at each wavelength is directly proportional to the product of unsaturation concentration and absorptivity. Absorptivities were taken from the literature values of deKock, R. J. and Hol, P., A., H., M., J. Poly. Sci. Part B, 2, 339 (1964). |

EXAMPLES

I. Preparation of Precursor Composition

In a 5 liter flask equipped with a mechanical stirrer, 16.0 g (0.168 Mol) of anhydrous MgCl$_2$ was mixed with 850 ml of pure tetrahydrofuran under nitrogen. The mixture was stirred at room temperature (~25° C.) while 13.05 g (0.069 Mol) of TiCl$_4$ was added dropwise. After complete addition, the contents of the flask were heated to reflux for about ½ to 1 hour to dissolve the solids. The system was cooled to room temperature and 3 liters of pure n-hexane was slowly added over a period of ¼ hour. A yellow solid precipitated. The supernatant liquid was decanted and the solids were washed with 3× one liter of n-hexane. The solids were filtered and dried in a rotating evaporating flask at 40°-60° C. to give 55 g of solid precursor composition.

The precursor composition may be analyzed at this point for Mg and Ti content since some of the Mg and/or Ti compound may have been lost during the isolation of the precursor composition. The empirical formulas used herein in reporting these precursor compositions are derived by assuming that the Mg and the Ti still exist in the form of the compounds in which they were first added to the electron donor compound and that all other residual weight in the precursor composition is due to the electron donor compound.

Analysis of the solid showed the following: Mg:6.1%; Ti:4.9%; which corresponds to TiMg$_{2.45}$Cl$_{8.9}$(THF)$_{7.0}$. THF means tetrahydrofuran.

II. Activation Procedures

Procedure A.—This procedure relates to a multistep activation of the precursor composition. In this procedure the activation is conducted in such a way that the precursor composition is only partially activated prior to the introduction thereof into the polymerization reactor, and then the remainder of the activation process is completed within such reactor.

The desired weight of dry inert carrier material is charged to a mixing vessel or tank. For the examples described herein the amount of inert carrier is about 500 grams for silica and about 1000 grams for a polyethylene carrier. The inert carrier material is then admixed with sufficient amounts of anhydrous, aliphatic hydrocarbon diluent such as isopentane to provide a slurry system. This usually requires about 4 to 7 ml of diluent per gram of inert carrier. The desired weight of the precursor composition is then charged to the mixing vessel and thoroughly admixed with the slurry composition. The amount of precursor composition used in this procedure for making the catalysts in these examples is about 80 to 135 grams, with such precursor composition having an elemental titanium content of 1±0.1 millimole of Ti per gram of precursor composition.

The desired amount of activator compound needed to partially activate the precursor composition is added to the contents of the mixing vessel so as to partially activate the precursor composition. The amount of activator compound used in this regard provides an Al/Ti ratio in the partially reduced precursor composition of >0 to <10:1 and preferably of 4 to 8:1. The activator compound is added to the mixing tank in the form of a solution which contains about 20 weight percent of the activator compound (triethyl aluminum in these examples) in an inert aliphatic hydrocarbon solvent (hexane in these examples). The activation is accomplished by thoroughly mixing and contacting the activator compound with the precursor composition. All of the operations described above are conducted at room temperature, and at atmospheric pressure in an inert atmosphere.

The resulting slurry is then dried under a purge of dry inert gas such as nitrogen or argon, at atmospheric pressure at a temperature of ≦60° C. to remove the hydrocarbon diluent. This process usually requires about 3 to 5 hours. The resulting product is in the form of a dry free-flowing particulate material wherein the activated precursor composition is uniformly blended with the inert carrier. The dried non-pyrophoric product is stored under an inert gas.

Where additional activator compound is fed to the polymerization reactor in this Procedure A for the purposes of completing the activation of the precursor composition, it may be first absorbed on an inert carrier material such as silica or polyethylene, or, most preferably, it may be injected into the reaction zone as a dilute solution in a hydrocarbon solvent such as isopentane.

Where the activator compound is to be absorbed on a silica support, the two materials are mixed in a vessel containing about 4 ml of isopentane per gram of carrier material. The resulting slurry is then dried for about 3 to 5 hours under a purge of nitrogen at atmospheric pressure at a temperature of 65°±10° C. to remove the hydrocarbon diluent.

Where the activator compound is to be injected into the polymerization reaction system as a dilute solution, concentrations of about 5 to 10% by weight are preferred.

Regardless of the method used to introduce the activator compound into the polymerization reactor for the purposes of completing the activation of the precursor composition, it is added at a rate such as to maintain the Al/Ti ratio in the polymerization reactor at a level of $\geq 10$ to 400:1 and preferably of $\geq 10$ to 100:1.

Prior to being used herein, the silicas are dried at $\geq 200°$ C. for $\geq 4$ hours.

Procedure B—In this procedure a complete activation of the precursor composition is accomplished by blending the precursor composition with, and thereby contacting it with, the activator compound which is absorbed on an inert carrier material.

The activator compound is absorbed on the inert carrier material by being slurried with the carrier material in an inert hydrocarbon solvent and by then drying the slurry to remove the solvent so as to provide a composition containing about 10 to 50 weight percent of activator compound. Thus, 500 grams of silica which has been previously dehydrated (at 800° C. for 4 hours) is charged to a mixing vessel. The desired amount of activator compound, as a 20 weight percent solution in hydrocarbon solvent, such as hexane, is then added to the mixing vessel and mixed (slurried) with the inert carrier at room temperature and atmospheric pressure. The solvent is then removed by drying the resulting slurry at 65°±10° C. for about 3 to 5 hours at atmospheric pressure under a flowing stream of dry inert gas such as nitrogen. The dried composition is in the form of free flowing particles having the size of the carrier material.

About 500 grams of the dried silica supported activator compound (50/50 weight percent of silica/activator compound) is then added to a mixing vessel. The desired weight of precursor composition (80–100 grams) is also added to the mixing vessel. The materials are then thoroughly mixed for about 1 to 3 hours at room temperature at atmospheric pressure under a dry inert gas such as nitrogen or argon. The resulting composition is in the form of a physical admixture of dry free-flowing particles having a size of the order of 10 to 150 microns. During the admixing operation the supported activator compound comes into contact with the precursor composition and completely activates it. During the resulting exothermic reaction the temperature of the catalyst composition should not be allowed to exceed 50° C. so as to avoid any significant deactivation of the catalyst. The resulting activated composition has an Al/Ti ratio of about 10 to 50 and may be pyrophoric where it contains >10 weight percent of the activator compound. It is stored under a dry inert gas such as nitrogen or argon prior to being injected into the reactor.

EXAMPLE 1

Ethylene was copolymerized with propylene or butene-1 (propylene in Runs 1 and 2 and butene-1 in Runs 3 to 13) in each of this series with catalyst formed as described above and as activated by Activation Procedure A to produce polymers having a density of $\leq 0.940$. In each case, the partially activated precursor composition had an Al/Ti mol ratio of 4.4 to 5.8. The completion of the activation of the precursor composition in the polymerization reactor was accomplished with triethyl aluminum (as a 5 weight % solution in isopentane in Runs 1 to 3 and 6 to 13, and adsorbed on silica, 50/50 weight %, in Runs 4 and 5) so as to provide the completely activated catalyst in the reactor with an Al/Ti mol ratio of about 29 to 140.

Each of the polymerization reactions was continuously conducted for >1 hour after equilibrium was reached and under a pressure of about 300 psig and a gas mass flow of about 5 to 6 times $G_{mf}$ in a fluid bed reactor system at a space time yield of about 3 to 8 lbs/hr/ft³ of bed space. The reaction system was as described in the drawing above. It has a lower section 10 feet high and 13½ inches in (inner) diameter, and an upper section which was 16 feet high and 23½ inches in (inner) diameter.

In several of the runs zinc diethyl was added during the reaction (as a 2.6 weight % solution in isopentane) to maintain a constant Zn/Ti mol ratio where the zinc diethyl was used, the triethyl aluminum was also added as a 2.6 weight % solution in isopentane.

Table A below lists, with respect to Runs 1 to 13 various operating conditions employed in such examples i.e., the weight % of precursor composition in the blend of silica and precursor composition; Al/Ti ratio in the partially activated precursor composition; Al/Ti ratio maintained in the reactor; polymerization temperature; % by volume of ethylene in reactor; $H_2$/ethylene mol ratio; comonomer $(C_x)/C_2$ mol ratio in reactor; catalyst productivity. Table B below lists properties of the granular virgin resins made in runs 1 to 13, i.e., density; melt index (M.I.); melt flow ratio (MFR); bulk density and average particle size.

TABLE A

Reaction Conditions For Runs 1 to 13

| Run No. | Weight % precursor | Al/Ti ratio in part. act precursor | Al/Ti ratio in reactor | Temp °C. | Vol % $C_2$ | $H_2/C_2$ mol ratio | $C_x/C_2$ mol ratio |
|---|---|---|---|---|---|---|---|
| 1 | 8.3 | 5.8 | 40.5 | 90 | 41.7 | 0.492 | 0.486 |
| 2 | 8.3 | 5.8 | 50.8 | 90 | 39.7 | 0.566 | 0.534 |
| 3 | 20.1 | 4.50 | 88.3 | 85 | 56.3 | 0.148 | 0.450 |
| 4 | 19.8 | 4.40 | 26.7 | 85 | 50.2 | 0.350 | 0.350 |
| 5 | 19.8 | 4.40 | 26.7 | 80 | 54.1 | 0.157 | 0.407 |
| 6 | 6.9 | 5.08 | 42.0 | 85 | 49.2 | 0.209 | 0.480 |
| 7 | 6.9 | 5.08 | 33.6 | 85 | 46.5 | 0.208 | 0.482 |
| 8 | 6.9 | 5.08 | 28.8 | 85 | 42.1 | 0.206 | 0.515 |
| 9 | 8.3 | 5.8 | 124.6 | 90 | 45.1 | 0.456 | 0.390 |
| 10 | 8.3 | 5.8 | 80.8 | 90 | 42.7 | 0.365 | 0.396 |
| 11 | 8.3 | 5.8 | 52.0 | 90 | 48.4 | 0.350 | 0.397 |
| 12 | 8.3 | 5.8 | 140.1 | 90 | 42.6 | 0.518 | 0.393 |
| 13 | 8.3 | 5.8 | 63.5 | 90 | 40.8 | 0.556 | 0.391 |

TABLE B

Properties of Polymers Made in Runs 1 to 13

| Run No. | Density | M.I. | MFR | bulk density | average particle size, inches |
|---|---|---|---|---|---|
| 1 | 0.927 | 22.0 | 24.4 | 16.8 | 0.0230 |
| 2 | 0.929 | 24.0 | 23.4 | 17.5 | 0.0230 |
| 3 | 0.925 | 0.61 | 27.1 | 16.8 | 0.0300 |
| 4 | 0.931 | 12.0 | 26.7 | 16.8 | 0.0275 |
| 5 | 0.923 | 1.47 | 28.2 | 15.6 | 0.0404 |
| 6 | 0.919 | 3.41 | 25.9 | 16.8 | 0.0550 |
| 7 | 0.925 | 2.90 | 24.5 | 17.5 | 0.0590 |
| 8 | 0.919 | 3.10 | 24.6 | 16.2 | 0.0570 |
| 9 | 0.929 | 16.0 | 24.1 | 17.3 | 0.0230 |
| 10 | 0.929 | 15.3 | 24.0 | 16.6 | 0.0234 |
| 11 | 0.928 | 11.5 | 24.1 | 16.7 | 0.0248 |
| 12 | 0.929 | 20.7 | 24.3 | 17.3 | 0.0258 |
| 13 | 0.929 | 29.2 | 26.1 | 16.8 | 0.0206 |

EXAMPLE 2—CONTROL

The control is a high pressure commercial polyethylene resin (Union Carbide DNDA 0415) produced in a stirred reactor at 16,000 psi and 205° C.

EXAMPLE 3

The resins as produced in Examples 1 and 2 were injection molded into dishpans and lids using an eight ounce Impco and a three ounce Moslo injection molding machines, respectively.

The dishpans were injection molded on an 8 oz. Impco machine at a cylinder temperature of 500° F., an injection gauge pressure of 1400 psi and a mold close time of 44 seconds. The other pertinent machine setting are as set forth in Table I.

The lids were injection molded on a three ounce Moslo ram machine at a material temperature of 545° F., at a gauge pressure of 825 psi and a mold close time of 15 seconds. The lids were center gated with an opening 0.030 inches in diameter, 0.030 inches long and were six inches in diameter, 0.040 inches thick. The other pertinent conditions are listed in Table 1.

TABLE I

| Machine Type | Impco | Moslo |
|---|---|---|
| Injection Pressure, psi | 1400 | 825 |
| Cylinder Temp., °F. | | |
| Nozzle | 500 | 500–550 |
| Front | 500 | — |
| Center | 500 | 500–550 |
| Rear | 450 | 475–525 |
| Mold Temp., °F. | | |
| Movable | 80 | 52 |
| Stationary | 75 | 52 |
| Cycle, sec | | |
| Injection | 12 | 2–3 |
| Clamp (mold closed time) | 44 | 15 |
| Booster | 4 | 1.5 |
| Prepack | 4 | 2 |
| Gate Delay | 12 | — |
| Gate-to-Gate | 72 | 18 |

Each of the resins of Examples 1 and 2 were tested for secant modulus of elasticity according to ASTM D638. Also, the melt index, density and melt flow ratio of these resins is as set forth in Table II.

The lids were tested for stress crack resistance in Crisco oil. The lids were bent with the lips facing outside and opposite edges touching and stapled together. The bent section opposite the stapled edges was then immersed in Crisco oil until cracking was observed. The results are as set forth in Table II.

The low temperature impact strength of the dishpans was measured at −40° F. and −60° F. by dropping a ten pound cylindrical dart with a one inch diameter hemispherical head onto the dishpan sprue area from increasing heights in three inch increments until the dishpan shattered or was punctured. The height at which failure occurred was multiplied by the dart weight and the result was reported in foot-pounds. The degree of warpage and gloss was determined by visual observations in comparison with the same part molded under the same conditions from the high pressure polyethylene resin of the same melt index and density.

The data shows that articles molded from the ethylene hydrocarbon copolymer of the present invention have higher rigidity as shown by the secant modulus, excellent stress crack resistance, impact strength and warpage resistance, as compared to articles molded from high pressure polyethylene resin.

TABLE II

| | Example 1 | Example 2 |
|---|---|---|
| Resin Properties | | |
| Melt Index | 20 | 20 |
| Density | 0.925 | 0.924 |
| Melt Flow Ratio | 25 | 35 |
| Properties of Articles | | |
| Secant Modulus, psi | 41,000 | 28,000 |
| Stress Crack Resistance, Time For Failure | >21 Days | 3 Minutes |
| Impact Strength at −60° F., Ft-lbs | 20.8 (Punctured) | 5 (Shattered) |
| Warpage Resistance | Excellent | V. Good |

EXAMPLES 4 to 7

Copolymers were prepared according to the procedure of Example 1. The comonomer which is reacted with ethylene to produce the copolymer, melt index, density and melt flow ratio of the copolymers produced, is as set forth in Table III.

TABLE III

| Example | Comonomer | Melt Index | Density | Melt Flow Ratio |
|---|---|---|---|---|
| 4 | butene-1 | 17.8 | 0.928 | 29 |
| 5 | propylene | 19.2 | 0.928 | 25.5 |
| 6 | butene-1 | 29 | 0.925 | 23 |
| 7 | propylene/butene (50/50) | 29 | 0.927 | 23 |

EXAMPLES 8 TO 11

Each of the polymers of Examples 4 to 7 were molded into dishpans on an 8 oz. Impco molding machine, as described in Example 3, with a cylinder temperature and a gauge pressure approximately 100 psi above the minimum pressure to fill the mold, as set forth in Table IV. The low temperature impact strength of the dishpans was measured at −40° F. and −60° F. according to the procedure as described in Example 3. The results are set forth in Table IV.

The data shows that articles, such as dishpans, molded form copolymers of the present invention have excellent impact strength.

TABLE IV

| Example | Resin (Example) | Molding Conditions Cylinder Temp. (°F.) | Minimum Pressure to fill mold (psi) | Impact Strength Ft./Lbs. −40° F. | Impact Strength Ft./Lbs. −60° F. |
|---|---|---|---|---|---|
| 8 | 4 | 500 | 1250 | — | 20 (Punctured) |
| 9 | 5 | 500 | 1250 | — | 18.3[(1)] |
| 10 | 6 | 400 | 1100 | 25 (Punctured) | 20.8 (Punctured) |
| 11 | 7 | 400 | 1050 | 21.7 (Punctured) | 19.1 (Punctured) |

[(1)] 2 out 6 cracked

EXAMPLES 12 TO 15

Each of the polymers of Examples 4 to 7 were molded into lids on a three-ounce Moslo injection molding machine, as described in Example 3, with a cylinder temperature and a gauge pressure about 120 psi above the minimum pressure to fill the mold, as set forth in Table V. The lids were tested for stress crack resistance in Crisco oil according to the procedure as described in Example 3. The results are set forth in Table V.

The data shows that articles such as lids produced from the copolymer of the present invention have excellent stress crack resistance.

TABLE V

| Example | Resin (Example) | Molding Conditions Cylinder Temp. (°F.) | Minimum Pressure to fill mold (psi) | Stress Crack Resistance |
|---|---|---|---|---|
| 12 | 4 | 500 | 825 | >21 days |
| 13 | 5 | 500 | 825 | >21 days |
| 14 | 6 | 500 | 550 | >21 days |
| 15 | 7 | 500 | 550 | >21 days |

EXAMPLES 16 TO 23

Butene-1 copolymers of Examples 16 to 20 were prepared according to the procedure of Example 1. The comonomer reacted to form the polymer, and the density melt index and secant modulus of the coplymers produced are as set forth in Table VI.

The high pressure polyethylene resins of Examples 21 to 23 were commercially available under the designation PEP 231, 530 and 440 (Union Carbide Corporation)

TABLE VI

| Example | Comonomer | Density | Melt Index | Secant Modulus (psi) |
|---|---|---|---|---|
| 16 | butene-1 | 0.918 | 7.0 | 32,100 |
| 17 | butene-1 | 0.926 | 12.0 | 41,100 |
| 18 | butene-1 | 0.928 | 18.0 | 48,600 |
| 19 | butene-1 | 0.928 | 30.0 | 48,700 |
| 20 | butene-1 | 0.937 | 7.0 | 70,000 |
| 21 | — | 0.919 | 10.0 | 19,000 |
| 22 | — | 0.924 | 9.5 | 25,000 |
| 23 | — | 0.926 | 28.0 | 29,000 |

EXAMPLES 24 to 31

The resins as prepared in Examples 16 to 23 were rotomolded into heater ducts. These resins were ground to a powder which passed through a U.S. 35 mesh screen and evaluated in a heater duct mold 7 inches square, 24 inches long with an average wall thickness of 0.125 inches. The oven temperature was 580° F., the oven cycle was 12 minutes (except Examples 18 and 19 for which the cycle was 8 minutes) and the mold was cooled by spraying it with cold water for three minutes.

The moldability of each of the resins evaluated was determined. Also, the falling dart impact of each of the samples at −40° C. was measured using a 10 pound cyclindrical dart with a one inch diameter hemispherical head dropped form two feet. The percentage of the samples which failed are shown in Table VI. The flex life as determined in a Ross rubber flex tester with a 90° bend operated at 120 cycles per minute, was also measured for several of these rotomolded samples. Environmental stress crack resistance was measured according to the ASTM D1693 bent strip test using 100% Igepal slit specimens and a temperature of 50° C. This data is shown in Table VII.

The data shows that for a comparable modulus and melt index, the low pressure copolymer resins form rotomolded parts which are substantially better than the high pressure resins in low temperature impact strength, flex life and stress crack resistance.

TABLE VII

| | Low Pressure Resins | | | | | | High Pressure Resins | |
|---|---|---|---|---|---|---|---|---|
| Examples | 24 | 25 | 26 | 27 | 28 | 29 | 30 | 31 |
| Resin (Examples) | 16 | 17 | 18 | 19 | 20 | 21 | 22 | 23 |
| Moldability | Exc. | Exc. | Exc. | Exc. | Exc. | Exc. | Exc. | Exc. |
| % passing 20 ft-lbs at −40° C. | 100 | 100 | 100 | 100 | 100 | 100 | 0 | 0 |
| Flex Life, cycles for 50% failure | 150,000 | 5,000 | — | — | — | — | 3,000 | — |
| Stress Crack Resistance, Hours for 100% failure | >504 | — | 15 | 1 | 25 | 4 | 1 | 1 |

EXAMPLE 32

The butene-1 copolymer resins of Examples 16 to 20 were injection molded into lids and then subjected to the Crisco oil stress crack resistance test as previously described. No cracking was observed in the bent section after 21 days of immersion in the Crisco oil. Under similar conditions the high pressure resin of Example 3 cracked after three minutes.

EXAMPLE 33

The butene-1 copolymer resins of Examples 17 to 19 were injection molded into dishpans under conditions previously described and then tested for impact strengths at −60° F. according to the procedure also previously described. None of the dishpans shattered. Punctures in the dishpan occurred at the number of foot-pounds as indicated below in Table VIII. Dishpans molded from the high pressure control resin of Example 3 shattered at 5 foot-pounds. The data is shown in Table VIII.

TABLE VIII

| Resin Example | Impact Strength (Ft-lbs) |
|---|---|
| 17 | 25.8 (Puncture) |
| 18 | 20 (Puncture) |
| 19 | 20.8 (Puncture) |
| 3 | 5 (Shattered) |

EXAMPLES 34 TO 36

A butene-1 copolymer was prepared according to the procedure of Example 1. A commercially available high pressure polyethylene, designated DNDA 0180 (union Carbide Corporation) was used as the control. Also, included for comparison was the low pressue resin of Example 16 which was higher in melt index than either the butene-1 copolymer or the polyethylene.

The resins were compression molded into test specimens 0.125 inch thick according to ASTM D-1928 and tested for stress crack resistance in 100% Igepal according to the procedure of the ASTM D1693 bent strip test. The time for 50 percent of twenty molded specimens to crack was determined at 50° C. The results are shown in Table IX.

TABLE IX

| Examples | 34 | 35 | 36 |
|---|---|---|---|
| Resin Type | butene-1 copolymer | high pressure polyethylene | butene-1 copolymer (Ex. 16) |
| Melt Index | 1.0 | 2.0 | 7.0 |
| Density | 0.921 | 0.921 | 0.918 |
| Secant modulus, psi | 38,300 | 23,000 | 32.100 |
| Stress crack resistance, (hrs. for $F_{50}$) | >504 | 200 | >504 |

The results show that even though the low pressure resins are about 50% higher in modulus than the high pressure resin and hence under more stress in the bent strip test, they are substantially better in stress crack resistance than a high pressure stirred reactor resin which is considered one of the most stress crack resistant commercially available polyethylenes. Even when the melt index of the low resin was increased to 7.0, as in Example 36, the low pressure resin was substantially more stress crack resistant than the high pressure resin having a melt index of 2.0. An increase in melt index normally reduces stress crack resistance.

What is claimed is:

1. A flexible injection molded article comprising low pressure copolymer of ethylene and at least one monomer selected from the group consisting of propylene and butene-1 having a density of $\geq 0.91$ to $\leq 0.94$; a melt index of $\geq 2$ to $\leq 80$; a $M_w/M_n$ in the range of from about 2.7 to about 4.1; a secant modulus of $\geq 30,000$ to $\leq 80,000$ psi; and a stress crack resistance of greater than 21 days.

2. A flexible injection molded article as in claim 1 in the form of a lid.

3. A lid in claim 1 wherein said copolymer has a density of $\geq 0.918$ to $\leq 0.935$.

4. A flexible injection molded article as in claim 1 wherein said copolymer has a total unsaturation group content of from about 0.1 to 0.3 C=C/1000 C atoms.

5. A flexible injection molded article as in claim 1 wherein said copolymer has a melt flow ratio of about $\geq 22$ to $\leq 32$; and a total unsaturation of from about 0.1 to 0.3 C=C/1000 C atoms.

6. A flexible injected molded article as in claim 1 having a molded hinge.

7. A rotomolded article comprising low pressure copolymer of ethylene and at least one monomer selected from the group consisting of propylene and butene-1 having a density of $\geq 0.91$ to $\leq 0.94$; a melt index of $\geq 2$ to $\leq 80$; a $M_w/M_n$ in the range of from about 2.7 to about 4.1; a secant modulus of from about 30,000 to about 80,000 psi; a stress crack resistance of greater than 21 days; and an impact strength at $-40°$ F. of $\geq 20$ foot pounds.

8. A rotomolded article as in claim 24 wherein said copolymer has a density of $\geq 0.918$ to $\leq 0.940$.

9. A rotomolded article as in claim 8 wherein said copolymer has a total unsaturation group content of from about 0.1 to 0.3 C=C/1000 C atoms; and a density of about $\geq 0.918$ to $\leq 0.935$.

10. A rotomolded article as in claim 9 wherein said copolymer has a melt flow ratio of about $\geq 22$ to $\leq 32$.

11. A molded article as in claim 7 having a flex life of 150,000 cycles.

* * * * *